Oct. 12, 1954

R. SWANSON 2,691,421

LAWN MOWER WHEEL DRIVE AND CONTROL THEREFOR

Filed May 6, 1950

INVENTOR.
Russel Swanson by: Bair, Freeman & Molinare
Attys.

Oct. 12, 1954    R. SWANSON    2,691,421
LAWN MOWER WHEEL DRIVE AND CONTROL THEREFOR
Filed May 6, 1950    3 Sheets-Sheet 2
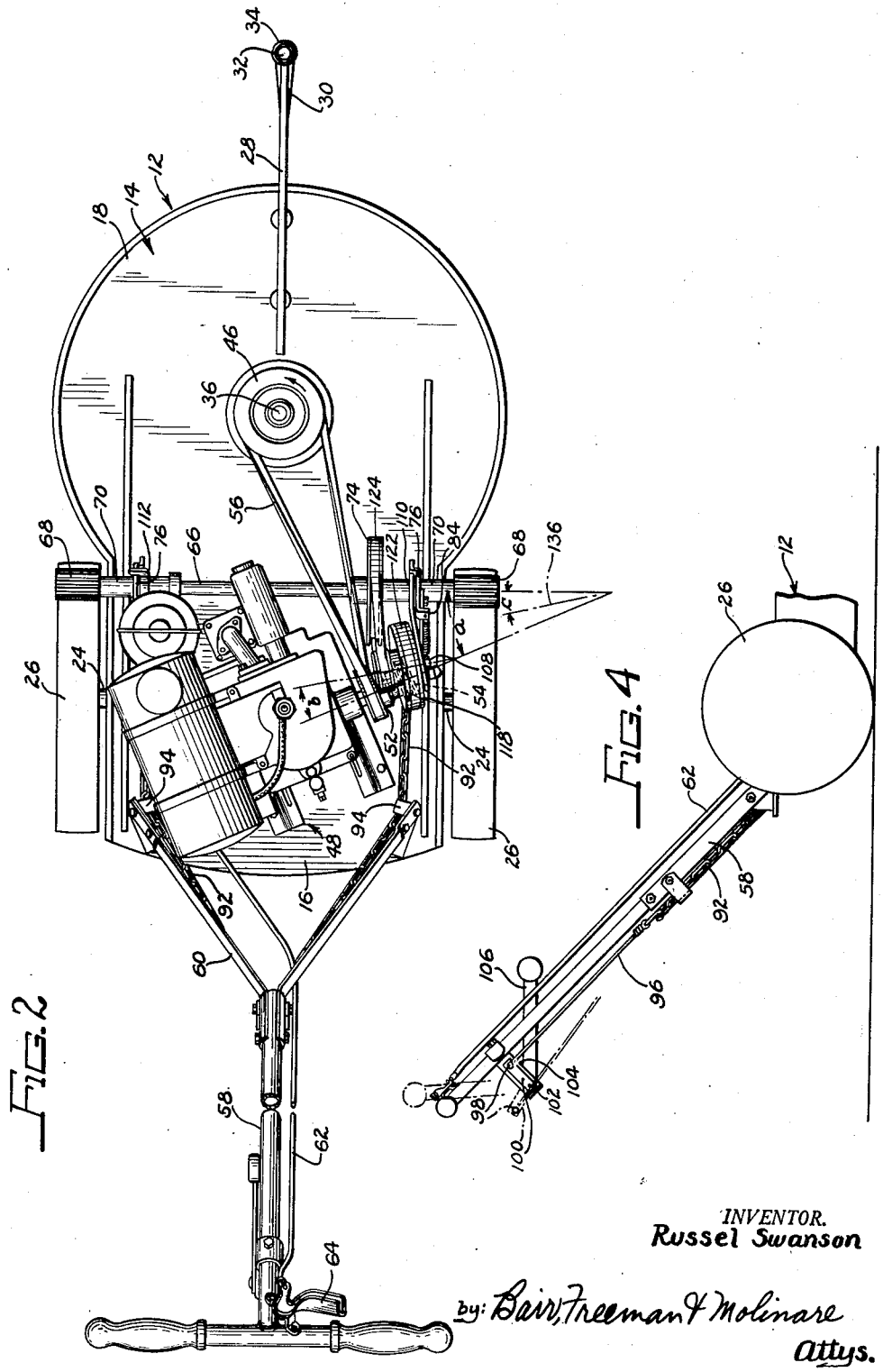
INVENTOR.
Russel Swanson
by: Bair, Freeman & Molinare
attys.

Oct. 12, 1954  R. SWANSON  2,691,421
LAWN MOWER WHEEL DRIVE AND CONTROL THEREFOR
Filed May 6, 1950  3 Sheets-Sheet 3
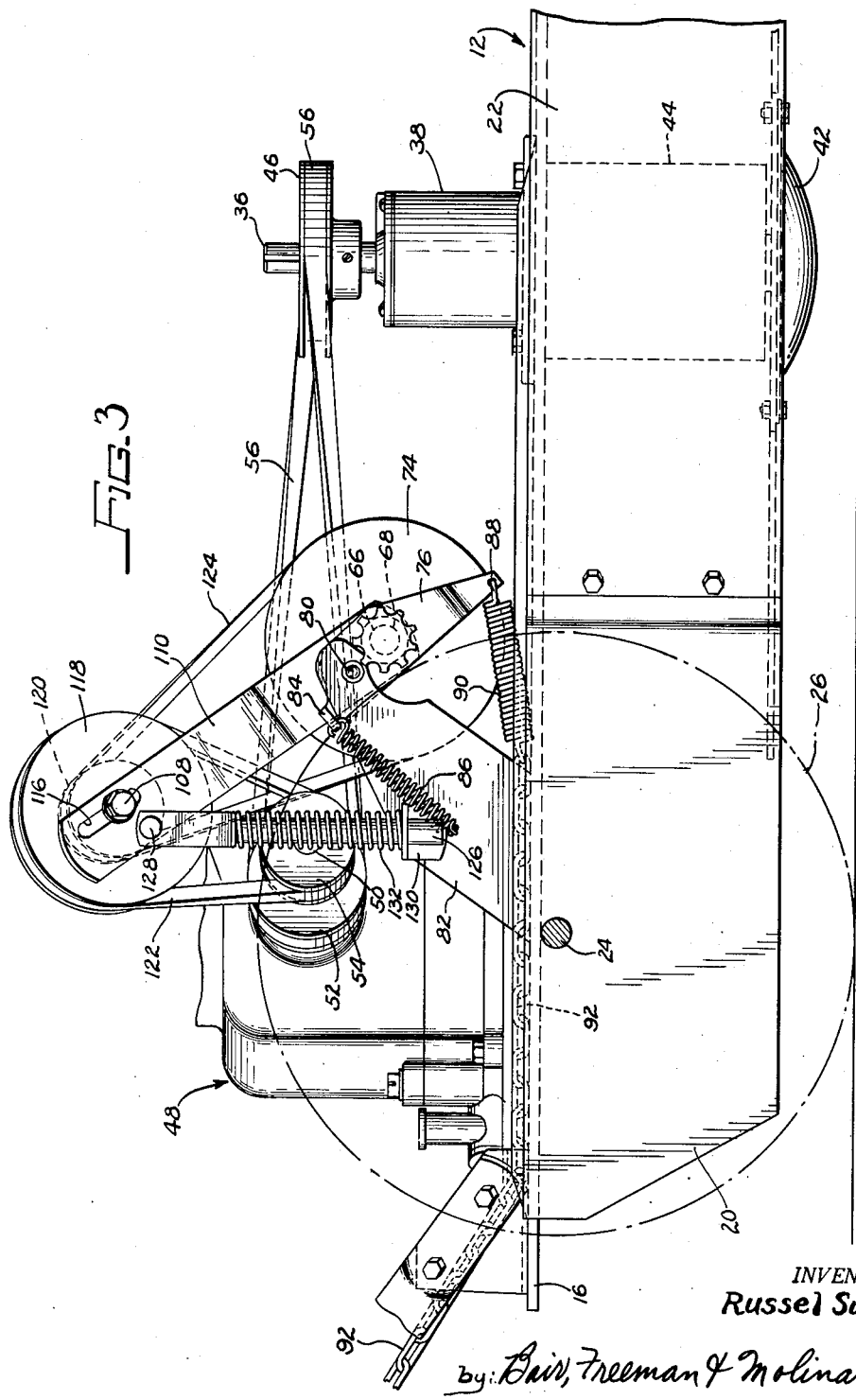
INVENTOR.
Russel Swanson
by: Baird, Freeman & Molinare
attys.

Patented Oct. 12, 1954

2,691,421

UNITED STATES PATENT OFFICE 2,691,421

LAWN MOWER WHEEL DRIVE AND CONTROL THEREFOR

Russel Swanson, Merrill, Iowa, assignor to Wind-King Electric Manufacturing Company, Merrill, Iowa, a corporation of Iowa Application May 6, 1950, Serial No. 160,410

4 Claims. (Cl. 180—74)

The present invention relates to power mowers and has for its objects certain improvements characteristic of the type of mower as will be explained more fully below. The mower to which the present invention is applied includes a wheel-mounted frame and a cutting blade, with a power unit mounted on the frame for driving the blade. The blade rotates on a vertical axis and the power unit, which in this case is an engine, has the power shaft extending to the side. In order for the power shaft to be aligned with the shaft on which the blade is mounted, it is necessary to turn the engine at an angle, and because the engine is turned at an angle, its power shaft is, of course, disposed at an angle to the axis of the wheels, which is significant in understanding the present invention.

The present invention includes an apparatus for driving the mower wheels by the power unit or engine, so that the mower becomes a self-propelled unit. The driving shaft or traction shaft is arranged for engaging the peripheries of the wheels, and for that reason it is disposed parallel with the axis of the wheels. Accordingly the power shaft of the engine is disposed at an angle to the traction shaft and in transmitting power from the power shaft to the traction shaft, it becomes necessary to employ a specially adapted arrangement of power-transmitting means.

An object, therefore, of the present invention is the provision of a countershaft so disposed that it divides the angle between the power shaft and the traction shaft, so that drive-transmitting belts can be connected with the power shaft and ultimately the traction shaft without the necessity of an abrupt change of direction that would be caused by the angle between the power shaft and the traction shaft if it were not for the countershaft.

A more specific object is the provision of a countershaft as just referred to, which is disposed so as to bisect the angle between the power shaft and the traction shaft, and the provision of a drive belt from the power shaft to the countershaft and another drive belt from the countershaft to the traction shaft, whereby the drive-transmitting means from the power shaft to the traction shaft consists in a plurality of units, each of which changes direction only a small amount.

Another object is the provision of a traction shaft of the character above referred to, which can be moved into and out of operative position for engaging the peripheries of the wheels for propelling the mower.

Still another object is the provision of a countershaft in an arrangement of the character above referred to, together with novel means for tightening the countershaft so that the belt means are retained taut. A more specific object is the provision of a countershaft mounted on a bracket, which in turn is mounted on the traction shaft, whereby the countershaft can be swung about the traction shaft as an axis and in all positions of the countershaft the belt means interconnecting the countershaft and traction shaft remains taut, and the countershaft can be swung toward and from the power shaft for controlling the tautness of the belt means interconnecting the power shaft and the countershaft.

A further object is the provision of a countershaft of the character above referred to, so arranged as to eliminate the tendency to climb, of the belt means interconnecting the countershaft and traction shaft.

A still further object is the provision of a drive arrangement of the character above referred to, in which the countershaft can be swung out of its normal position, whereby the power shaft of the engine is free for use in operating or driving separate apparatus.

Another object is the provision of a traction shaft mounted on universal bearings adjacent its ends, whereby each end can be moved into and out of operative position with respect to its driving wheel independently of the other end.

With these and other objects in view, my invention consists in the construction, arrangement and combination of the various parts of my device whereby the objects contemplated are attained as hereinafter more fully set forth, pointed out in my claims and illustrated in the accompanying drawings, wherein:

Figure 2 is a plan view of the mower;

Figure 3 is a side elevational view of the main portion of the mower, and

Figure 4 is a reduced scale view of the mower handle and a small portion of the mower itself.

Figure 1:
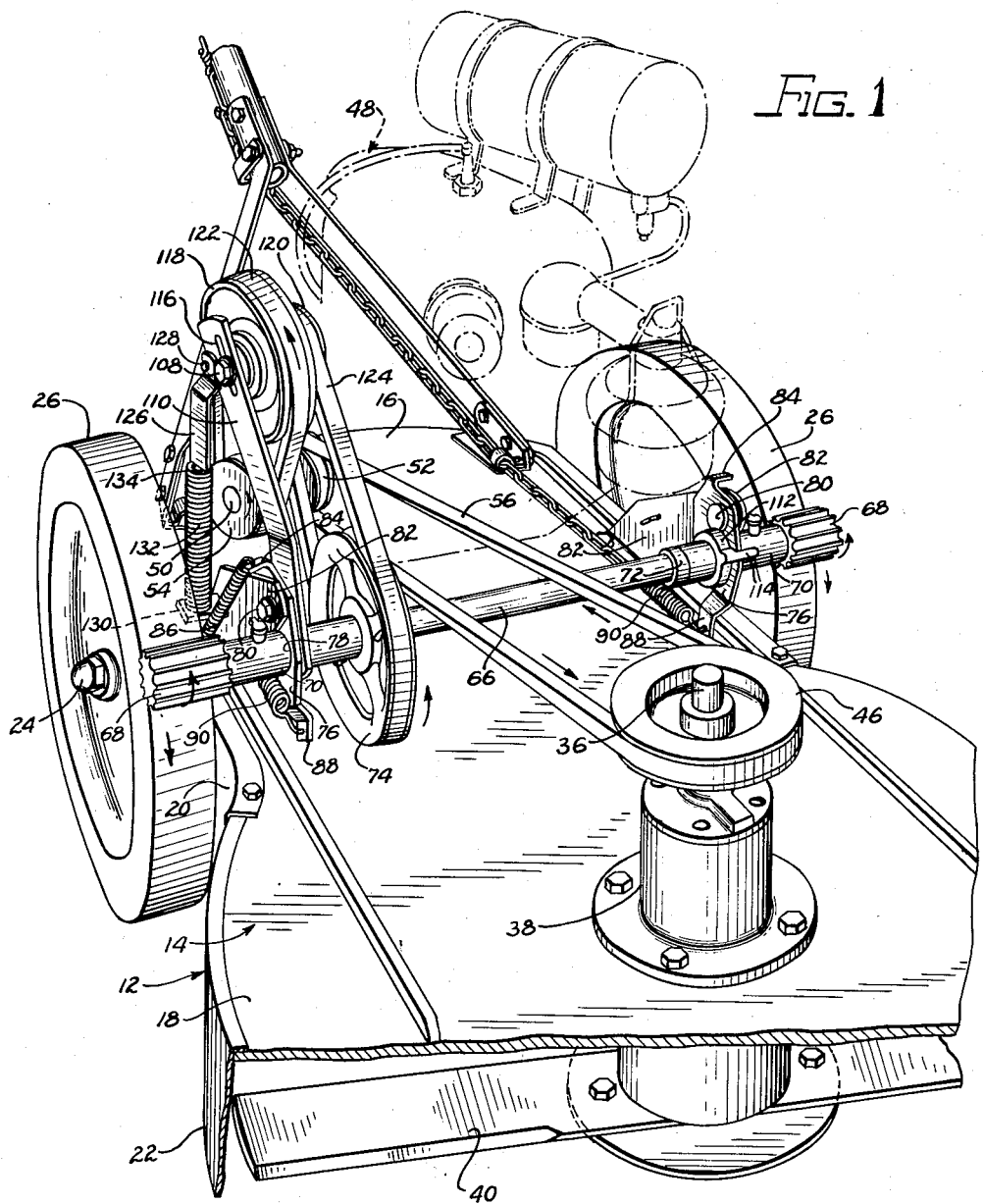
Figure 1 is a perspective view of the main portion of the mower to which the present invention is applied.

Referring in detail to the drawings, the mower includes a frame 12 which includes a top plate 14 having a rear reduced portion 16 forming a deck for the power unit, and a forward portion 18 which is for the most part circular. The rear reduced portion 16 has a depending flange or skirt 20, and the forward circular portion 18 has a similar flange or skirt 22, the two flanges 20 and 22 encircling the frame. The flange 20 is provided with means for forming bearings in which is journalled an axle 24 for the drive wheels 26. The wheels 26 form the main support for the mower, and it is through the wheels 26 that the drive is imparted to the mower, as will be explained later. Adjacent the front end of the mower is a vertical plate 28 forming a support for a front caster wheel 30 on a vertical shaft 32 which is mounted in a bearing 34 at the front end of the plate. The caster wheel 30 provides a portion of the support for the mower but the mower is so balanced that it can be easily manipulated to rotate it about the main axle 24. The front caster wheel 30 spaces the mower from the ground in the normal use of the mower.

A vertical shaft 36 is rotatably mounted in an appropriate bearing 38 supported on the portion 18 of the top plate, and extends through the plate, having on its lower end a cutting blade 40 adapted for swinging in a horizontal plane on rotation of the shaft 36. The cutting blade 40 has a downwardly extending dome portion 42 on its lower surface, and the shaft above the cutting blade is surrounded by a shield 44 of a diameter less than that of the dome element 42. A drive pulley 46 is mounted on the upper end of the shaft 36.

The power unit or engine above referred to is indicated generally at 48 and in the present instance consists of a conventional gasoline engine. The engine 48 is provided with a power shaft 50 having drive pulleys 52 and 54, the two pulleys 52 and 54 in the persent instance being a single integral unit mounted on the power shaft 50, by appropriate key means, for rotation with the shaft. As noted above, the terminal end of the shaft 50 and the pulleys 52 and 54 are disposed to one side of the engine. The shaft 36 on which the cutter blade is mounted is centrally located, and the engine 48 is therefore turned at an angle with respect to the frame so that the pulley 52 is in alignment with the pulley 46. A belt 56 interconnects the pulleys 52 and 56, the alignment being such that the pulley 52 is in substantially direct alignment with that side of the pulley 46 to which power is directly applied, namely, the far side of the pulley 46 with respect to the observer's position.

A handle 58 is mounted on the rear end of the frame of the mower, having a forked portion 60 for that purpose. A control rod 62 for controlling the engine 48 extends to the upper end of the handle, where it is connected with a lever 64 under the control of the operator. The foregoing describes a mower to which the device of my invention is applied. A mower as above described is a power mower, because the cutter blade is driven from an engine. The present invention as applied to such a power mower converts the mower into a self-propelled mower.

The traction shaft referred to is indicated at 66 and is appropriately mounted on the frame of the mower in the position generally ahead of the wheels 26. On each end of the traction shaft is a fluted driving element fixed to the shaft for rotation therewith and adapted to engage the periphery of the respective wheel 26. Inwardly of each driving element 68 is a sleeve 70, in which the end of the shaft is rotatably journalled, the sleeve being held in position axially between the driving element 68 and a collar 72 fixed on the shaft. A pulley 74 is mounted on the shaft for rotation therewith, adjacent the end of the shaft near the power shaft 50 of the engine.

The traction shaft 66 is mounted in a pair of elongated brackets or bearings 76 which are in the form of plates. The bearings 76 are provided with bearing openings 78 in which the sleeves 70 of the shaft are mounted. The thickness of the bearings 76 is relatively small, with the result that the traction shaft 66 is universally mounted in each of the bearings; i. e., either end of the shaft and its bearing can be moved independently of the other within a given range, and in all positions thereof there is adequate bearing support in each bearing.

Each elongated bracket or bearing 76 is pivotally mounted intermediate its ends at 80 in a bracket 82 mounted on the top plate of the mower frame. The two brackets 82 are parallel and positioned adjacent the sides of the frame. The bearings 76 are adapted for swinging movement about the pivot mountings 80, whereby the traction shaft 66 is moved, and more particularly moved into and out of operative position with respect to the driving wheels. At the upper end of each bracket or bearing 76 is a lug 84 to which is connected one end of a tension spring 86, the other end of which is connected to the bracket 82 (Figure 3). The springs 86 bias the bearings 76 in such a direction that they normally move the lower ends of the bearings forwardly and move the traction shaft 66 out of operative position—that is, move the driving elements 68 out of engagement with the wheels.

At the lower end of each bracket or bearing 76 is a lug 88 to which is connected one end of a tension spring 90. The springs 90 are of greater strength than the springs 86, for a purpose to appear later. The springs 90 extend rearwardly and the other ends are connected to chains 92 which pass through eyelets 94 and then upwardly along the handle portions 60, where they may conveniently be connected with a rod 96. The rod 96 is pivotally connected at 98 in the swinging end of a lever 100, which is pivotally mounted at 102 in a bracket 104 mounted on the upper end of the handle. A lever 106 is rigidly interconnected with the lever 100 at its pivot point and as the lever 106 is swung rearwardly (Figure 4) the lever 100 is also swung rearwardly, pulling or drawing the chains 92 rearwardly. This movement of the chains swings the lower ends of the bearings 76 rearwardly and moves the traction shaft 66 into operative position wherein the drive elements 68 engage the peripheries of the wheels. The dotted line position of the lever 100 indicates that it is slightly over-center, and in such position it locks the chains 92. The reason that the springs 90 are of greater strength than the springs 86 is so that the springs 90 overcome the springs 86 and move the traction shaft into operative position. However, upon release of the tension in the springs 90, the springs 86 normally swing the bearings 76 so as to move the traction shaft out of operative position.

Figure 2 illustrates to best advantage the angle between the axis of the power shaft 50 and the traction shaft 66. That angle designated "a" is in the present instance approximately 24°, and it is well known that it is not feasible, to interconnect a belt between pulleys on shafts that are out of alignment to that extent. For the purpose of effectively interconnecting the pulley on the power shaft with the pulley on the traction shaft, a countershaft 108 is provided. The countershaft 108 is mounted on the extended end of a countershaft bracket or arm 110 which is secured at its other end to the respective sleeve 70, the connection being made by welding or other convenient means. The arm 110 is disposed inwardly of and abuts the adjacent bearing 76 to prevent axial thrust of the shaft 66. At the other end of the traction shaft 66 is a collar 112 welded or otherwise secured to the respective sleeve 70, which also aids in preventing axial thrust of the traction shaft. A finger 114 is secured to the collar 112 and extends over the marginal edge of the respective bearing 76.

The countershaft bracket or arm 110 is adapted for swinging about the axis of the traction shaft 66, since the sleeve 70 is rotatable on the shaft. In the swinging end of the arm 110 is a longitudinally disposed slot 116 in which the countershaft 108 is mounted. The shaft 108 is provided with appropriate elements for abutting the surfaces of the arm, including a nut for tightening the shaft in position. Rotatably mounted on the countershaft 108 are pulleys 118 and 120. It will be understood that either the countershaft itself may be rotatable, with the pulleys secured for rotation therewith, or the countershaft may be fixed with the pulleys rotatable thereon, and the claims are to be interpreted accordingly. A belt 122 interconnects the pulley 54 on the power shaft and the pulley 118 on the countershaft. A belt 124 interconnects the pulley 120 on the countershaft and the pulley 74 on the traction shaft. Thus drive is transmitted from the power shaft to the traction shaft. The arm 110 is twisted so that the countershaft 108 is disposed on an axis that substantially bisects the angle between the power shaft and traction shaft, as will be referred to later in detail. Furthermore, the upper end of the arm 110 is bent outwardly, whereby the countershaft 108 is inclined at an angle to the horizontal so that there is no plane common to the countershaft and power shaft, or to the countershaft and traction shaft.

A member or link 126 is pivoted in its upper end at 128 in the countershaft bracket or arm 110 adjacent the swinging end of the arm, the link having a reduced lower end slidable in a hole in a bracket 130 fixedly mounted on the adjacent bracket 82. A compression spring 132 surrounds the reduced portion of the link 126 and is biased between the abutment 134 formed by the upper enlarged portion, and the bracket 130. The spring 132 biases the arm 110, and thereby the countershaft, upwardly. The axis of the countershaft 108 is disposed at an angle of substantially 12° with the axis of the power shaft as indicated by the angle "b" in Figure 2. The axis of the countershaft, therefore, bisects the angle between the power shaft and the traction shaft. This relationship is indicated by the angle "c" which is substantially 12° between the line 136 and the axis of the traction shaft. The line 136 is parallel with the axis of the countershaft. Since there is an angle of 12° between either two related shafts in the drive-transmitting arrangement, there is only an angle of 6° between each pulley and the main length of the belt to which it is connected. It will be understood that when a belt is interconnected between two pulleys there is a certain length which constitutes the major portion of the length of the belt that is straight, and the pulley at each end is out of alignment only to the extent of 6° with that length of belt. The same relationship exists between the pulleys 120 and 74 and the interconnecting belt as just described above.

It will, therefore, be seen that I have provided an extremely effective arrangement constituting an effectively aligned drive between shafts that are out of alignment to a considerable degree. The inclination of the countershaft 108 from horizontal assures that the belt 124 does not ride up on the pulley 120.

The slot 116 in the arm 110 enables the countershaft to be adjusted longitudinally of the arm for tightening the belt 124, and when the belt is once tightened, the arm can swing about the axis of the shaft 66 and in all positions thereof the belt 124 will be taut. The compression spring 132 biases the arm 110 upwardly and carries the countershaft therewith, retaining the belt 122 normally taut, thus serving as a lost motion means for maintaining the drive transmitting means between the power plant and the countershaft operative.

If a stone or other obstruction should work between either driving element 68 and the periphery of the wheel, that end of the traction shaft can be swung out of operative position without moving the other end by reason of the universal mounting of the traction shaft in the bearing openings 78. Self-alignment is provided for the bearing mounting of the traction shaft.

If desired, the belt 122 can be removed from the pulley 54 and the arm 110 with the countershaft and pulleys swung clear of the power shaft of the engine for the purpose of connecting a belt with the power shaft for driving other apparatus separate from the mower.

Some changes may be made in the construction and arrangement of the parts of my machine without departing from the real spirit and purpose of my invention, and it is my intention to cover by my claims such modified forms of structure or use of mechanical equivalents as may be reasonably included within their scope.

I claim as my invention:

1. A power mower having a frame, drive wheels on said frame, a power plant supported on said frame and having a power shaft extending therefrom, a rotatable traction shaft supported on said frame, said shaft having elements thereon adapted to engage and rotate said drive wheels, said power shaft and traction shaft lying substantially horizontal and being disposed at an angle to each other, a countershaft mounted on said frame disposed so that a vertical plane through its axis intersects the vertical planes through the axes of said traction shaft and power shaft at substantially equal angles each equal to substantially one-half said angle between the power shaft and the traction shaft, pulleys on said power shaft, traction shaft and countershaft, and belt-type drive transmitting means trained over said pulleys on said shafts for interconnecting said power shaft and countershaft, and interconnecting said countershaft and traction shaft.

2. A power mower having a frame, drive wheels on said frame, a power plant mounted on said frame, a rotatable traction shaft driven by said power plant and bodily movable toward and away from said drive wheels, said traction shaft having elements adapted to engage and rotate the drive wheels, said traction shaft being carried by elongated brackets which are pivotally mounted intermediate their length on said frame about axes parallel to and spaced from the axis of said traction shaft, spring means connected to one end of each bracket biasing said traction shaft away from said drive wheels, pull means connected to the other end of each bracket and adapted to be manually manipulated for selectively pivoting the traction shaft toward said drive wheels, a countershaft bracket mounted on said traction shaft, a countershaft on said countershaft bracket, drive transmitting means interconnecting said countershaft and traction shaft, and drive transmitting means interconnecting said power plant and said countershaft.

3. A power mower having a frame, drive wheels on said frame, a power plant mounted on said frame, a rotatable traction shaft driven by said power plant and bodily movable toward and away from said drive wheels, said traction shaft having elements adapted to engage and rotate the drive wheels, said traction shaft being carried by elongated brackets which are pivotally mounted intermediate their length on said frame about axes parallel to and spaced from the axis of said traction shaft, spring means connected to one end of each bracket biasing said traction shaft away from said drive wheels, pull means connected to the other end of each bracket and adapted to be manually manipulated for selectively pivoting the traction shaft toward said drive wheels, a countershaft bracket mounted on said traction shaft, a countershaft on said countershaft bracket, drive transmitting means interconnecting said countershaft and traction shaft, drive transmitting means interconnecting said power plant and said countershaft, said countershaft bracket being pivotable about said traction shaft, and lost motion means for maintaining the drive transmitting means between said countershaft and said power plant operative.

4. A power mower having a frame, drive wheels on said frame, a power plant mounted on said frame, a rotatable traction shaft driven by said power plant and bodily movable toward and away from said drive wheels, said traction shaft having elements adapted to engage and rotate the drive wheels, said traction shaft being carried by elongated brackets which are pivotally mounted intermediate their length on said frame about axes parallel to and spaced from the axis of said traction shaft, spring means connected to one end of each bracket biasing said traction shaft away from said drive wheels, pull means connected to the other end of each bracket and adapted to be manually manipulated for selectively pivoting the traction shaft toward said drive wheels, a countershaft bracket mounted on said traction shaft, a countershaft on said countershaft bracket, drive transmitting means interconnecting said countershaft and said traction shaft, drive transmitting means interconnecting said power plant and said countershaft, said countershaft bracket being pivotable about said traction shaft, and lost motion means for maintaining the drive transmitting means between said countershaft and said power plant operative, said lost motion means including a member pivoted on said countershaft bracket and a compression spring between said frame and said member.

References Cited in the file of this patent

UNITED STATES PATENTS

| Number | Name | Date |
|--------|------|------|
| 285,942 | Woolsey | Oct. 2, 1883 |
| 1,764,851 | Palm | June 17, 1930 |
| 2,166,450 | Smalley | July 18, 1939 |
| 2,474,085 | Albright | June 21, 1949 |
| 2,474,524 | Hainke | June 28, 1949 |
| 2,522,112 | Gilmour | Sept. 12, 1950 |
| 2,523,439 | May | Sept. 26, 1950 |
| 2,523,640 | Zipf | Sept. 26, 1950 |